United States Patent Office 2,864,874
Patented Dec. 16, 1958

2,864,874

PREPARATION OF m- AND p-DIISOPROPYL-BENZENE

Herman I. Enos, Jr., Wilmington, Del., assignor to Hercules Powder Company, Wilmington, Del., a corporation of Delaware No Drawing. Application June 29, 1953
Serial No. 364,963

8 Claims. (Cl. 260—671)

This invention relates to the production of diisopropylbenzene and more particularly to the preparation of m-diisolpropylbenzene and p-diisopropylbenzene.

The production of diisopropylbenzene for use as an antiknock fuel by alkylation of benzene with refinery gas is well known. However, the processes of the prior art have always led to mixtures of isomers from which the individual isomers were not separable in a pure state by distillation processes. The m-isomer, for instance, which is particularly desired for use as an intermediate for chemical syntheses by oxidation reactions, is not separable from the o-isomer by distillation nor from trimethylindane which is formed as a by-product from the o-isomer in the prior art processes. The presence of the o-isomer and trimethylindane was not recognized heretofore. In copending application, Serial No. 364,941, filed June 29, 1953, now abandoned, is described and claimed a process for the propylation of benzene to a mixture of diisopropylbenzene isomers free of the o-isomer and free of trimethylindane and from which m-diisopropylbenzene is readily separated by distillation. This process uses aluminum chloride as a catalyst in an amount within a critical range and a temperature in the range of 65–115° C. Under these conditions refinery gas cannot be used as the source of propylene, however, because other unsaturates present in the refinery gas also combine with the benzene ring. Thus to attain the advantages of this process for producing a mixture containing no o-isomer or trimethylindane, this cheap source of propylene cannot be used directly.

Now in accordance with the present invention, it has been found that m-diisopropylbenzene can be produced by a process, in which it is possible to use refinery gas as an economical source of propylene, which process involves propylation of benzene with refinery gas and further propylation of the cumene produced thereby with substantially pure propylene in the presence of 0.1 to 2 mole percent aluminum chloride catalyst, based on the moles cumene used, at a temperature in the range of 65–115° C. whereby the readily separable mixture of m-diisopropylbenzene and p-diisopropylbenzene is produced and from which m-diisopropylbenzene is recovered by distillation. The process is carried out by propylating benzene in a first alkylation reaction preferably with refinery gas using any suitable catalyst for the production of pure cumene, and subsequently contacting the cumene in a second alkylation reaction with propylene free of other unsaturates in the presence of 0.1 to 2 mole percent of aluminum chloride at a temperature in the range of 65–115° C. and subsequently distilling m-diisopropylbenzene from the reaction mixture.

The process essentially involves a first alkylation reaction for the preparation of cumene preferably from refinery gas followed by a second alkylation reaction for the propylation of cumene under conditions that produce a reaction mixture containing essentially m-diisopropylbenzene but no o-diisopropylbenzene or trimethylindane, from which mixture the m-diisopropylbenzene is separable by distillation. From the first alkylation step the by-product refinery gas of reduced propylene content is recovered for use as a fuel or for any other purpose. The by-products of the second alkylation reaction are: benzene, cumene, p-diisopropylbenzene and polyisopropylbenzenes. These by-products are preferably recycled to the appropriate alkylation reaction so that there is a continuous constant amount of these by-products flowing back to this step in the process. Only the benzene is recycled to the first alkylation step.

The process of the present invention may thus be expressed in its more specific aspect by the following flow sheet:

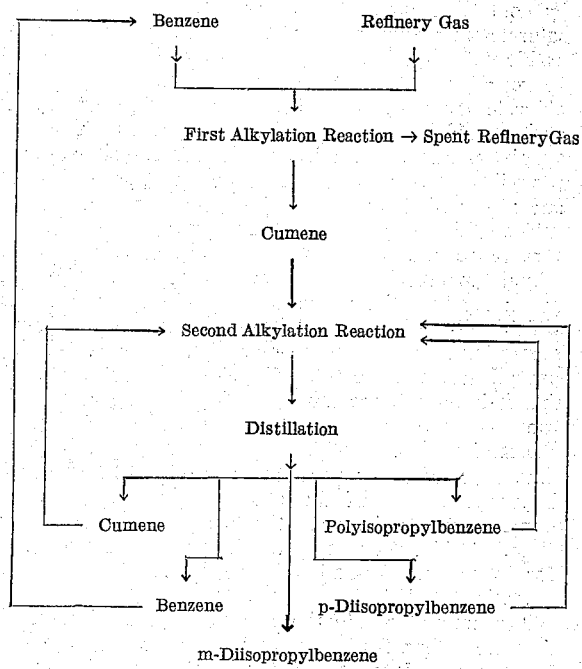

The acid-acting condensation catalysts for effecting alkylation of benzene with propylene are well known in the art. In the production of cumene, any of the catalysts such as sulfuric acid (80%), phosphoric acid on kieselguhr, ferric or cupric pyrophosphate, aluminum chloride, zinc chloride, acid clays, HF, BF₃ and its complexes with ether, or mixtures of any of these catalysts can be used since the cumene is readily prepared in pure form free of objectionable impurities. It is preferred, however, to alkylate in the vapor phase using phosphoric acid on kieselguhr or copper pyrophosphate as the catalyst.

The propylene-containing gas used in the alkylation step for the production of cumene should be free of higher molecular weight unsaturates which might also react, but the gas may contain ethylene from which the propylene will be removed due to its greater reactivity. The process of this invention is particularly well adapted for use of refinery gases which are mixtures of ethylene, propylene, and saturated hydrocarbon gases. The term "refinery gas" is used herein to include only such gases as are free of higher unsaturates such as butene or butadiene. Such a refinery gas can be readily obtained from a gas containing these higher molecular weight unsaturated gases by well known selective adsorption methods whereby the higher molecular weight unsaturates are removed. While the cumene prepared from gas containing these higher unsaturates can be readily purified by distillation, it is preferable to avoid a gas that unnecessarily gives more by-products.

The propylene used in the alkylation for preparation of the cumene may thus be either pure propylene free of ethylene or it may be a mixture of propylene and ethylene. When pure propylene is used, any of the above-designated catalysts may be used. However, when the propylene-containing gas contains ethylene, the catalyst selected must be one which is selective. Phosphoric acid on kieselguhr and copper pyrophosphate are particularly useful for this purpose, but other catalysts may also be used selectively. Sulfuric acid (80%), for example, is such a selective catalyst. As is well known, it can be used for preparing cumene from a mixture of propylene and ethylene without contamination with ethylated products.

The second alkylation reaction for propylation of cumene to produce a mixture from which m-diisopropylbenzene is readily separable by distillation is carried out by contacting cumene with propylene free of other unsaturates in the presence of 0.1 to 2 mole percent (preferably 0.3 to 0.8 mole percent), based on the moles benzenoid material in the reaction mixture, of aluminum chloride at a temperature in the range of 65–115° C. for a time sufficient to produce a mixture containing substantial amounts of m-diisopropylbenzene and/or p-diisopropylbenzene and substantially no o-diisopropylbenzene and no trimethylindane.

The critical conditions of the process are the temperature range and the amount and type of catalyst used. Aluminum chloride is required for the production of a product substantially free of the o-diisopropylbenzene, which boils so close to m-diisopropylbenzene as to make separation impossible when more than a trace of o-diisopropylbenzene is present. The temperature is critical in that it is only in the range of 65–115° C. that m-diisopropylbenzene and p-diisopropylbenzene are formed in substantial amounts with the o-isomer substantially absent. At lower temperatures there is an increasingly larger proportion of the o-isomer produced, and this isomer prevents the separation of the m-isomer in pure form. At higher temperatures there is a greater tendency for by-product formation. The preferred temperature range is 80–115° C.

The amount of aluminum chloride is also critical in that more than 2 mole percent based on the benzenoid components of the reaction mixture causes by-product formation even in the 65–115° C. range which is necessary for the production of the favorable isomer ratio. The main by-product which is found to be formed due to an excess of aluminum chloride is trimethylindane which apparently is formed by the interaction of the isopropyl radicals of the o-isomer. This trimethylindane boils along with m-diisopropylbenzene in fractional distillation and is not separable by any known process of distillation. Its presence is readily detected by infrared absorption analysis.

In carrying out the process of this invention, the lower concentration of aluminum chloride catalyst in the range set forth is used with the higher temperatures in the range set forth, and the higher concentration of aluminum chloride catalyst in the range set forth is used with the lower temperatures in the range set forth. Thus 0.1 mole percent aluminum chloride used at a reaction temperature of 115° C. and 2 mole percent of aluminum chloride used at a reaction temperature of 65° C. will produce in either case a mixture of m- and p-diisopropylbenzene substantially free of o-diisopropylbenzene and trimethylindane from which m- and p-diisopropylbenzene are separable in substantially pure form.

While the ratio of propylene to cumene is not critical with respect to the production of the desired ratio of isomers, the amount used generally will be that well known in the art for the production of the optimum yield of diisopropylbenzene with a minimum of mono- and poly-isopropylbenzenes. However, alternatively mono- and poly-isopropylbenzenes may be produced in larger amounts if their simultaneous production is desired.

Moreover, the mono- and poly-isopropylbenzenes obtained as by-products may be recycled to the propylation step or to a disproportionation step as set forth and claimed in copending application, Serial No. 364,965, filed June 29, 1953, now U. S. Patent No. 2,744,150. Moreover, the p-diisopropylbenzene may be passed to an isomerization unit wherein it is contacted with 0.1 to 2 mole percent of aluminum chloride at 65–115° C. to produce a mixture of m- and p-diisopropylbenzenes from which the m-diisopropylbenzene is separated by distillation. Such an isomerization step is described and claimed in copending application, Serial No. 364,964, filed June 29, 1953, now U. S. Patent No. 2,817,687.

The second alkylation reaction is generally initially carried out by mixing 0.1 to 2 mole percent anhydrous aluminum chloride powder with cumene preferably at a temperature below about 50° C. and then allowing the temperature to rise gradually to 65–115° C. at which temperature the reaction mixture is held until the resulting reaction mixture contains approximately an equilibrium composition. A particularly good method of operation for starting a batch is to add about 5 moles anhydrous aluminum chloride to 100 moles cumene cooled to about 10° C. and then to add the resulting mixture to 200–800 moles cumene. While stirring, propylene is then added gradually in an amount molecularly equal to the amount of cumene. The propylene is added at such a rate to the cumene-catalyst mixture at this elevated temperature that the temperature is easily controlled. The cumene may be added at atmospheric or superatmospheric pressure. The cumene-aluminum chloride mixture should not be allowed to heat up above about 50° C. before being diluted with the cumene mixture to the range of 0.1 to 2 mole percent based on the total cumene with which it is mixed. The method of mixing the cumene and the aluminum chloride is not limited to any particular procedure, the only precaution to be observed is that the mole percent of aluminum chloride dispersed in the cumene be kept in the range below 2 mole percent while the temperature is in the 65–115° C. range and preferably at any time the temperature is above about 50° C. for any appreciable period of time.

The reaction mixture, after it has reached approximate equilibrium, is worked up by removing the catalyst by any of the well known methods such as by centrifuging or filtering or by diluting with water, preferably containing acid or caustic to dissolve the aluminum hydroxide produced. The catalyst-free product after separation from the aqueous layer is then freed of water, by drying agent or by distilling. The products are then fractionally distilled to separate the benzene, cumene, m-diisopropylbenzene, p-diisopropylbenzene, and triisopropylbenzene in the proportions indicated below. The m-diisopropylbenzene is recovered and may be refractionated if the first fractionation is inadequate. The p-diisopropylbenzene may also be recovered. In operating the process particularly for the production of m-diisopropylbenzene, the other alkylated products are recycled to the second alkylation reaction along with fresh cumene. In such a recycling procedure, the benzene to be recycled is advantageously recycled to the first alkylation reaction step. In the second alkylation step which includes recycling of the by-products, the amount of fresh cumene added is equal in molecular quantity to approximately the amount of m-diisopropylbenzene withdrawn. Moreover, with the benzene recycled to the first alkylation reaction step, the amount of fresh benzene added is molecularly equal to about the amount of m-diisopropylbenzene which is withdrawn in the process. In this manner a two-step process is built up which involves withdrawing m-diisopropylbenzene from the cycle of the second step and adding an amount of benzene to the first step equal to the molecular amount of m-diisopropylbenzene withdrawn.

In a continuous recycled process starting from 75 lb. cumene produced in the first alkylation step and carried through to the second alkylation step with 26 lb. propylene, about 37 lb. m-diisopropylbenzene is produced and withdrawn; about 1 lb. benzene is recycled to the first alkylation step and converted into cumene; about 20 lb. p-diisopropylbenzene, about 27 lb. triisopropylbenzene, about 14 lb. cumene and about 1 lb. tetraisopropylbenzene are recycled to the second alkylation reaction along with 29 lb. fresh cumene. The benzene, which is recycled to the first alkylation reaction along with additional benzene and an equimolecular amount of propylene in refinery gas and passed over a phosphoric acid catalyst at 200–300° C. at 300–400 lb./sq. in. pressure provides the 29 lb. fresh cumene for the second alkylation reaction.

The composition of the reaction mixture resulting from the second alkylation reaction does not vary appreciably with the temperature but does so with variations in the ratio of propylene to cumene. In Table 1 are shown compositions resulting from the use of more and less than the theoretical 1:1 ratio used in the example set forth above at about 100° C.

Table 1

| Component (Percent) | Propylene: Cumene (Mole Ratio) | | |
|---|---|---|---|
| | 0.4 | 1.0 | 1.3 |
| Benzene | 6 | 2.0 | Nil |
| Cumene | 38 | 18.5 | 8 |
| m-Diisopropylbenzene | 32 | 37.2 | 26 |
| p-Diisopropylbenzene | 16 | 18.6 | 13 |
| Triisopropylbenzene | 8 | 21.0 | 50 |
| Tetraisopropylbenzene | Trace | 0.6 | 2 |

The composition of the alkylation mixture at temperatures of 80° and 100° C. in the second alkylation reaction step using a 1:1 mole ratio of propylene to cumene is set forth in Table 2.

Table 2

| Component | Mole Percent at T° C. | |
|---|---|---|
| | 80° C. | 100° C. |
| Benzene | 2.0 | 2.0 |
| Cumene | 18.5 | 18.5 |
| m-Diisopropylbenzene | 37.2 | 37.2 |
| p-Diisopropylbenzene | 18.6 | 18.6 |
| Triisopropylbenzene | 21.0 | 21.0 |
| Tetraisopropylbenzene | 0.6 | 0.6 |

While the process of this invention is equally satisfactory for the production of both m- and p-diisopropylbenzene, it is particularly valuable for the production of m-diisopropylbenzene which is the more difficult of the two isomers to produce in the pure state.

Unless stated otherwise all percentages are by weight.

What I claim and desire to protect by Letters Patent is:

1. The method of preparing a diisopropylbenzene substantially free of o-diisopropylbenzene and trimethylindane which comprises propylating benzene in a first alkylation reaction with a substantially equimolecular amount of a propylene-containing gas, containing no higher molecular weight unsaturates, in the presence of an acid-acting condensation catalyst to substantially pure cumene, contacting the substantially pure cumene in admixture with about an equimolecular amount of propylene, free of other unsaturates, in a second alkylation reaction with 0.1 to 2 mole percent of the benzenoid material in the reaction mixture of aluminum chloride at a temperature in the range of 65–115° C. until the reaction mixture contains a substantial amount of diisopropylbenzene, substantially none of which is o-diisopropylbenzene and subsequently separating m-diisopropylbenzene from the reaction products by distillation.

2. The method of preparing a diisopropylbenzene substantially free of o-diisopropylbenzene and trimethylindane which comprises propylating benzene in a first alkylation reaction with a substantially equimolecular amount of a propylene-containing gas, containing no higher molecular weight unsaturates, in the presence of an acid-acting condensation catalyst to substantially pure cumene, contacting the substantially pure cumene in admixture with about an equimolecular amount of propylene, free of other unsaturates, in a second alkylation reaction with 0.3 to 0.8 mole percent of the benzenoid material in the reaction mixture of aluminum chloride at a temperature in the range of 80–115° C. until the reaction mixture contains a substantial amount of diisopropylbenzene, substantially none of which is o-diisopropylbenzene and subsequently separating m-diisopropylbenzene from the reaction products by distillation.

3. The method of preparing a diisopropylbenzene substantially free of o-diisopropylbenzene and trimethylindane which comprises propylating benzene in an alkylation reaction with a substantially equimolecular amount of a propylene-containing gas, containing no higher molecular weight unsaturates, in the presence of an acid-acting condensation catalyst to substantially pure cumene, contacting the substantially pure cumene in admixture with about an equimolecular amount of propylene, free of other unsaturates, in a second alkylation reaction, with 0.1 to 2 mole percent of the benzenoid material in the reaction mixture of aluminum chloride at a temperature in the range of 65–115° C. until the reaction mixture contains a substantial amount of diisopropylbenzene, substantially none of which is o-diisopropylbenzene, separating m-diisopropylbenzene from the reaction products by distillation, and recycling the alkylated by-products of the second alkylation reaction to the second alkylation reaction.

4. The method of preparing a diisopropylbenzene substantially free of o-diisopropylbenzene and trimethylindane which comprises propylating benzene in an alkylation reaction with a refinery gas, containing a substantially equimolecular amount of propylene and no higher molecular weight unsaturates, in the presence of an acid-acting condensation catalyst to substantially pure cumene, contacting the substantially pure cumene in admixture with about an equimolecular amount of propylene, free of other unsaturates, in a second alkylation reaction with 0.1 to 2 mole percent of the benzenoid material in the reaction mixture of aluminum chloride at a temperature in the range of 65–115° C. until the reaction mixture contains a substantial amount of diisopropylbenzene, substantially none of which is o-diisopropylbenzene and subsequently separating m-diisopropylbenzene from the reaction mixture by distillation.

5. The process of claim 4 in which the propylene-containing gas is a refinery gas.

6. The method of preparing a diisopropylbenzene substantially free of o-diisopropylbenzene and trimethylindane which comprises propylating benzene in an alkylation reaction with a substantially equimolecular amount of a propylene-containing gas, containing no higher molecular weight unsaturates, in the presence of an acid-acting condensation catalyst to substantially pure cumene, contacting the substantially pure cumene in admixture with about an equimolecular amount of propylene, free of other unsaturates, in a second alkylation reaction, with 0.1 to 2 mole percent of the benzenoid material in the reaction mixture of aluminum chloride at a temperature in the range 65–115° C. until the reaction mixture contains a substantial amount of diisopropylbenzene, substantially none of which is on-diisopropylbenzene, separating p-diisopropylbenzene from the reaction products by distillation, and recycling the alkylated by-products of the second alkylation reaction to the second alkylation reaction.

7. The method of preparing a diisopropylbenzene substantially free of o-diisopropylbenzene and trimethylindane which comprises propylating benzene in an alkylation reaction with a refinery gas, containing a substantially equimolecular amount of propylene and no higher molecular weight unsaturates, in the presence of an acid-acting condensation catalyst to substantially pure cumene, contacting the substantially pure cumene in admixture with about an equimolecular amount of propylene, free of other unsaturates, in a second alkylation reaction with 0.1 to 2 mole percent of the benzenoid material in the reaction mixture of aluminum chloride at a temperature in the range of 65–115° C. until the reaction mixture contains a substantial amount of diisopropylbenzene, substantially none of which is o-diisopropylbenzene and subsequently separating p-diisopropylbenzene from the reaction mixture by distillation.

8. The process of claim 7 in which the propylene-containing gas is a refinery gas.

References Cited in the file of this patent

UNITED STATES PATENTS

| | | |
|---|---|---|
| 2,324,784 | Lieber | July 20, 1943 |
| 2,465,610 | Short et al. | Mar. 29, 1949 |
| 2,730,551 | Max et al. | Jan. 10, 1956 |
| 2,744,150 | Enos et al. | May 1, 1956 |

OTHER REFERENCES

Berry et al.: Jour. Amer. Chem. Soc., vol. 49, pp. 3142–9 (December 1927).

Newton: Jour. Amer. Chem. Soc., vol. 65, pp. 320–3 (March 1943).

Organic Reactions, vol. III, pp. 3, 25 and 50, published by John Wiley and Sons, Inc., New York (1947).

Shreve: Industrial and Eng. Chem., vol. 40, p. 1569 (September 1948).